United States Patent

Royse et al.

[15] 3,653,066
[45] Mar. 28, 1972

[54] MAGNETIC TRANSFER IMPRINTER

[72] Inventors: David Royse; Guenther K. Machol, both of Saratoga, Calif.

[73] Assignee: International Business Machines Corporation, Armonk, N.Y.

[22] Filed: Dec. 29, 1969

[21] Appl. No.: 888,622

[52] U.S. Cl. ..................................346/74 MP, 340/149 A
[51] Int. Cl. ......................................G11b 5/16, G01d 15/12
[58] Field of Search................346/74 M, 74 MP; 340/149 A

[56] References Cited

UNITED STATES PATENTS 3,401,394  9/1968  Leonard et al. ....................346/74 MP

*Primary Examiner*—Bernard Konick
*Assistant Examiner*—Gary M. Hoffman
*Attorney*—Sughrue, Rothwell, Mion, Zinn & Macpeak

[57] ABSTRACT

A terminal is provided for recording fixed and variable transaction data in both human and machine readable form from a credit card having an encoded magnetic stripe or track and embossed identification data and from settable means having an encoded magnetic portion and an embossed portion for keying in the variable transaction data. The magnetic copy stripe or track on a record form is held in contact with the magnetic stripe on the credit card and the encoded portions of the settable means. The remainder of the form is placed over the embossures on the settable means and on the credit card. A transfer magnet head and a pressure roller are moved along the form to transfer the magnetic information to the magnetic stripe on the record form and to imprint the embossed information on the remainder of the record form. The transfer encoded ticket thus prepared is compatible with a direct recorded ticket.

1 Claims, 2 Drawing Figures

PATENTED MAR 28 1972  3,653,066

COLD ROLLED STEEL - 4PL.

.375  .25  .13

RUBBER BASED BARIUM FERRITE 3 PLATES

INVENTORS
DAVID ROYSE
GUENTHER K. MACHOL

BY Sughrue, Rothwell, Mion, Zinn & Macpeak

ATTORNEYS

MAGNETIC TRANSFER IMPRINTER

BACKGROUND OF THE INVENTION

1. Field of the Invention

The present invention is directed to the simultaneous transfer of visible and magnetic data and more particularly to a terminal for transferring such data from a credit card and variable settable means to a record form having a magnetic tape portion or stripe thereon.

2. Prior Art

It is well known in the art to transfer magnetic information from a master copy to a duplicate copy by means of superimposing the copies in engagement with each other and passing a plurality of magnets over the surface thereof, so that the magnetic transitions effect transfer of the magnetic information from the master to the duplicate copy.

Prior art terminals are also known, whereby magnetic information is transferred from a credit card to a magnetic journal tape and visible data in the form of embossed information on the credit card is transferred to a record form by means of a printing process. However, such prior art devices utilize a magnetic shunting technique in transferring the magnetic information since discrete magnetic particles are involved and such prior art devices fail to provide a record form having both the visible imprinted information and the transferred magnetic information thereon.

SUMMARY OF THE INVENTION

The present invention provides a terminal for simultaneously recording fixed and variable magnetic data on a magnetic stripe or area on a record form while simultaneously imprinting visual data on another portion of the record form, where "simultaneously" means both imprinting and transfer occur in a single operation, such as a single stroke or a combination forward and back stroke of the imprint roller and transfer head. The fixed data is represented by a magnetization pattern on a magnetic stripe or area on an embossed plastic card. The variable data is represented by the magnetization patterns on the surface of each of a set of movable embossed wheels. When the card and wheels are appropriately positioned in contact with the magnetic tape on the form, a permanent magnet assembly is moved over the elements to cause the recording. In addition, associated with the magnet assembly, is a roller which causes imprinting of the embossed data in the manner of a conventional embossed card imprinter.

The present invention provides an apparatus which is suitable for use by a ticket agent for the preparation of an airline ticket from a credit card and variable information on data wheels. The ticket would be readable in a coupon reader at the airline terminal and in addition, the coupon reader would be able to accept tickets prepared by a device which records data on the magnetic stripe of a ticket directly from a magnetic recording head. Thus, the transfer encoded ticket and the direct recorded ticket would be compatible and readable in the same apparatus. In order to accomplish this the data recorded on the credit card and variable wheels in the magnetic transfer imprinter would have to be a mirror image of that recorded by the direct recording terminal.

The present invention provides a magnetic transfer imprinter which is a low cost device for preparing machine readable documents and which may be completely passive, that is, not necessarily requiring an external source of power.

Other objects, features and advantages of the invention will be pointed out in the following detailed description and claims and illustrated in the accompanying drawings which show by way of example, and not limitation, the principle of the invention and preferred modes for applying that principle.

IN THE DRAWINGS

DETAILED DESCRIPTION OF THE INVENTION

Figure 1:
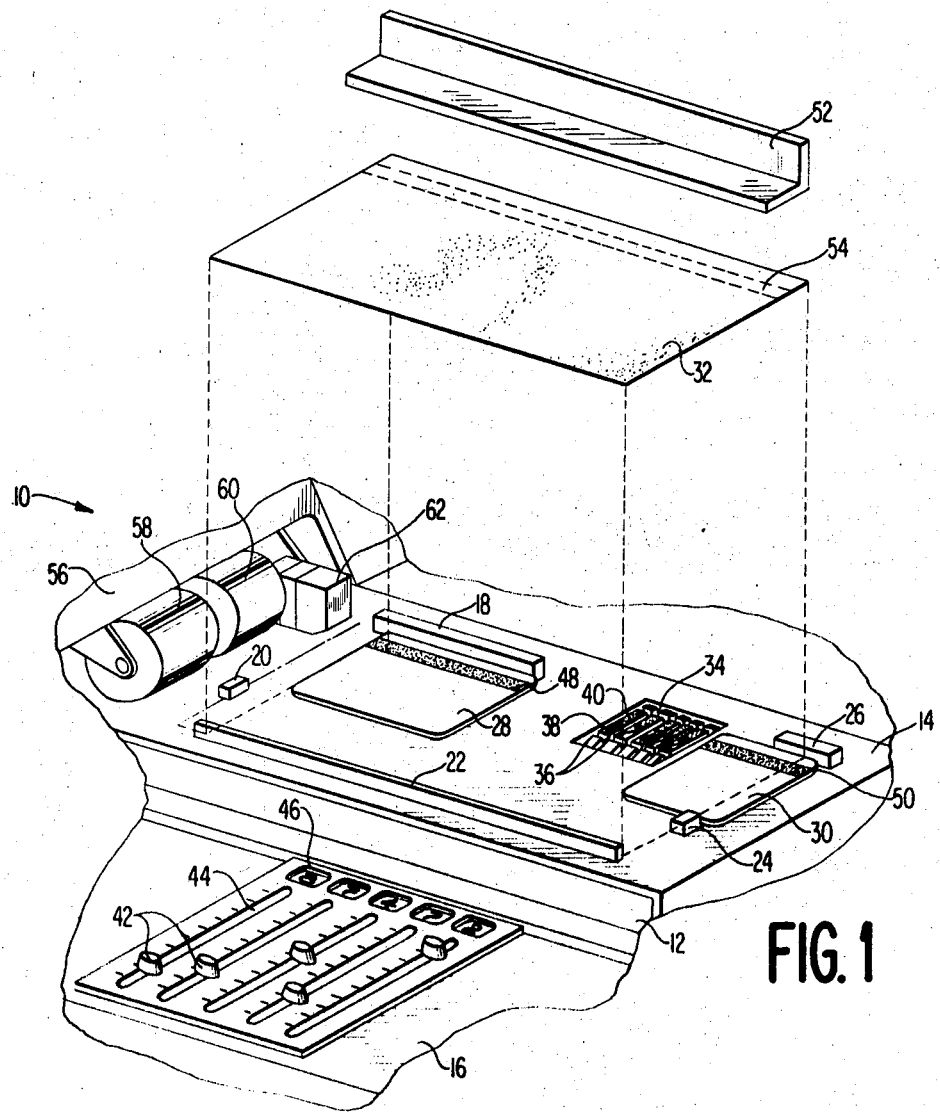
FIG. 1 is a partial exploded perspective view of a magnetic transfer imprinter according to the present invention.
Figure 2:
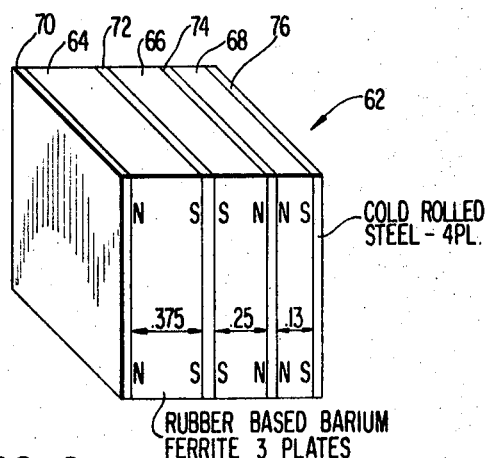
FIG. 2 is a perspective view of the magnetic transfer head according to the present invention.

The magnetic transfer imprinter generally designated at 10 is comprised of a base member 12 having a first upper surface 14 for the reception of credit cards, information cards, variable information wheels and record forms and a second upper surface 16, having means thereon for registering the correct variable information in the terminal. A plurality of guide bars or rails 18, 20, 22, 24 and 26 are secured to the first upper surface 14 to provide means for aligning the credit card 28, the variable information card 30, and the record form 32, in the proper position with respect to each other. The upper surface 14 is also provided with a cutout portion 34 through which the circumferences of a plurality of variable information wheels 36, protrude. Each of the wheels 36, is provided with a plurality of faces, each of which contains visible embossed information 38, and corresponding encoded magnetic information 40. The wheels are journaled for rotation about a common axis (not shown) and each wheel 36 is individually rotated to the proper position by means of a suitable linkage (not shown) which extends between the knobs 42 and the wheel 36. The knobs 42 may be pushed along the slots 44 and windows 46 are provided at the end of each slot in order to display a visual representation of the information which is being presented by the wheel 36 for transfer to the record form 32.

The credit card 28 is provided with a magnetic stripe 48 and the variable information card 30 is provided with a magnetic stripe 50 having the desired information encoded thereon. Embossed information corresponding to the encoded magnetic information may also be placed on the remainder of the cards 28 and 30 in the usual well known manner. A guide bar or pressure plate 52, is also provided for holding the record card 32 in close contact with the credit card 28, the wheels 36 and the variable information card 30, in the area adjacent the magnetic stripe 54 on the record form 32. The presser member 52 may be secured to the base of the terminal 12 in any suitable manner such as by pivoting so that it may be moved to an out-of-the-way location to allow insertion and removal of the various cards and forms.

A carriage 56, is slidably mounted on the base 12 of the terminal 10 in any desirable manner for a traversing movement along the length of the surface 14. A pair of transfer imprinting rollers 58 and 60 are rotatably mounted on the carriage 56 and during the traversing moving of the carriage, the rollers 58 and 60 will press the record form 32 against the embossed information on the credit card 28, the variable information wheels 36 and the information card 30, to imprint the information on the record form. The record form may be provided with a suitable carbon layer or the carbon may be disposed directly in the paper of the form.

A magnetic recording head 62 is also mounted on the carriage 56 in any suitable manner. The magnetic transfer head 62 is so positioned that upon traversing movement of the carriage 56, from left to right, as viewed in FIG. 1, the head 62 will pass directly over in close proximity to the superimposed magnetic stripes 54, 48, 40 and 50, to effect a transfer of magnetic information from the magnetic stripes 48, 40 and 50 to the magnetic stripe 54 on the record form 32. The magnetic recording head 62 is comprised of three permanent magnets, 64, 66 and 68. The permanent magnets 64, 66 and 68 are sandwiched between a plurality of cold rolled steel plates 70, 72, 74 and 76. Herein, the strength of the permanent magnets varies in the direction of travel of the magnetic head over the various magnetic stripes to provide a plurality of decaying magnetic field alternations for improving the efficiency of transfer of the magnetic information from the cards and wheels to the record form.

By applying the magnetic information onto the magnetic stripes 48, 40 and 50 in a mirror image format rather than directly applying the information thereon, the transferred information which is transferred from the magnetic stripes 48, 40 and 50 to the magnetic stripe 54 on the record form 32 will be in a form similar to that of directly recorded information. Thus, such an arrangement would make it possible to prepare a ticket, such as an airline ticket from a credit card and variable information on the data wheels. The ticket would be readable in a coupon reader at the airlines terminal. Furthermore, the coupon reader would also be able to accept tickets prepared by a device which records data on the magnetic stripe of a ticket directly from the magnetic recording head. Thus, the transfer encoded ticket and the direct recorded ticket would be compatible and readable in the same apparatus. Such apparatus is not illustrated but any conventional magnetic reader would be suitable.

While only a limited embodiment of the present invention has been shown and described in detail, there will now be obvious to those skilled in the art, many modifications and variations which satisfy many or all of the objects of the invention, but which do not depart from the spirit of the invention as defined by the appended claims.

What is claimed is:

1. A termina for recording fixed and variable transaction data in both human and machine readable form, comprising:

a base member having an upper surface, settable means mounted in said base member having an encoded magnetic portion and an embossed portion for entering variable transaction data, means on said base member for holding a record card having an encoded magnetic area and embossed identification data adjacent said settable means on said upper surface and for holding a single record form having an unmagnetized magnetizable surface in the form of a continuous stripe in contact with said record card and said settable means above said upper surface with said magnetizable stripe in contact with the magnetic area on said card and the encoded portions of said settable means, carriage means movably mounted on said base member comprising pressure roller means and a magnetic transfer head comprising a plurality of magnets of varying strength, means for passing said magnetic head along said magnetizable stripe on said record form in close proximity thereto and passing said roller under pressure along said embossures whereby the encoded magnetic information is transferred from the magnet area of said card and the encoded portions of said settable means to the magnetizable area of said record form and the embossed information is imprinted on the record form.

* * * * *